Nov. 29, 1932.    I. W. BROGGER    1,889,310

ELECTRICAL MEASURING INSTRUMENT

Filed Feb. 11, 1930

Inventor

IVAR W. BROGGER

Attorney

A. D. T. Libby

Patented Nov. 29, 1932

1,889,310

UNITED STATES PATENT OFFICE

IVAR W. BROGGER, OF MERIDEN, CONNECTICUT, ASSIGNOR TO CONNECTICUT TELEPHONE & ELECTRIC CORPORATION, OF MERIDEN, CONNECTICUT

ELECTRICAL MEASURING INSTRUMENT

Application filed February 11, 1930. Serial No. 427,575.

This invention relates to an electrical measuring instrument for measuring current flowing in an electric circuit.

In the design of electrical measuring instruments, such as ammeters, which are used on automotive vehicles, the trend has continually been to reduce the number of parts and thereby the cost of manufacture. These instruments are made and used in very large quantities, and for that reason the design should be such as to lend itself to mass production.

It is the object of my present invention to simplify and cheapen the cost of the construction of such an instrument, and at the same time secure an instrument which is rugged and capable of performing the necessary functions.

My invention will be readily understood by reference to the annexed drawing, wherein.

Figure 1:
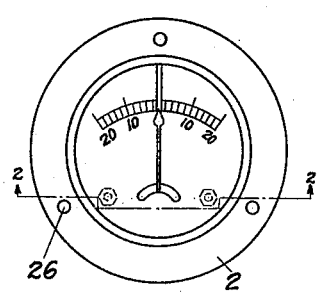
Figure 1 is a plan view of the instrument ready to be mounted.
Figure 3:
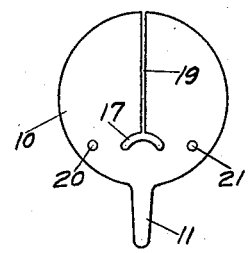
Figure 3 is a plan view of the particular form of dial used, without the scale being shown.
Figure 2:
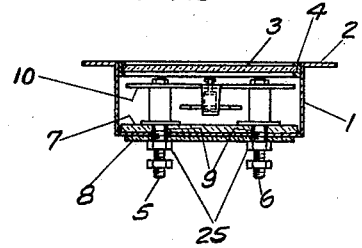
Figure 2 is a part-sectional and part-elevational view on the line 2—2 of Figure 1.
Figures 4, 5:
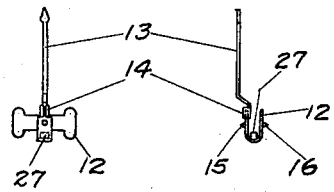
Figure 4 is a plan view of the movable parts of the instrument.
Figure 5 is a side elevation of Figure 4.

In the drawing wherein like numbers refer to corresponding parts in the various views, 1 is a casing of the instrument having a flange or rim 2 for mounting the instrument.

The flange 2 has holes 26 therein for fastening the instrument. The face of the casing is closed with a transparent member such as a piece of glass 3, which is usually held in a resilient holding member 4. A pair of contact terminal studs 5 and 6 are carried by the casing, at least one of them, and preferably both, being insulated from the casing by insulators 7 and 8, and bushings 9.

Figure 6:
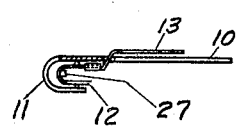
Figure 6 is a side elevation of the dial, showing the movable system carried thereby.

Carried on the inner ends of the studs 5 and 6 is a dial 10. The dial 10 is provided with a finger or projection 11 which is turned over as shown in Figure 6 to furnish a support for the armature 12 which comprises a part of the movable system. In the form shown, only two parts make up the movable system; i. e., the armature 12 and a pointer 13 which is preferably made with very light material such as aluminum. The pointer 13 may be fastened to the armature 12 in any satisfactory manner. In the drawing, this is illustrated by a turned-over portion 14. This turned-over portion may be on the armature element or on the pointer element, but in either case the turned-over portion grips the end of the associated member.

The armature 12 is preferably provided with a small counterweight 27 which may be attached thereto in any satisfactory manner, this small counterweight being placed in line with the pointer, thereby acting to return the pointer 13 to the zero position as shown in Figure 1, when the current through the instrument falls to zero. The armature 12 is provided with pivot points 15 and 16 which may be projections punched directly from the material of the armature. These pivot points are seated in suitable depressions formed in the projection or finger 11 which is a part of the dial 10. Preferably, the armature 12 is I-shaped.

The dial 10 has an arcuate slot 17 to receive the bent portion 18 of the pointer 13; and the dial 10 is also slotted at 19 to direct the flux across that part of the dial between the studs 5 and 6 which have reduced ends that pass through the holes 20 and 21 respectively.

The passage of the current through the dial at the portion indicated, will set up a magnetic field which acts on the armature 12 to move the end of the pointer, whereby the current flowing through the instrument is indicated on the dial.

While the slot 19 in the dial 10 is shown arranged on a diameter and directly below the pointer 13 in its normal zero position, the slot 19 may be on a segmental line extending from the arcuate slot 17. The purpose of the slot 19 is to force the current passing from one terminal stud to the other, to transverse that portion of the dial directly over the armature 12, which of course is magnetic material. The length of the slot 19 and its shape control to quite some extent the graduations on the dial, as the movement of the armature depends on the magnetic field set up by the magnetizing current flowing through the dial, and as this current is controlled by slot 19 and to some extent by the slot 17, the scale will therefore depend on the position and size of these slots.

It will be seen that the movable system comprises only two parts—the armature and the pointer—and these are assembled to the dial plate to which the studs 5 and 6 are attached, so that the operating part of the instrument is an assembled unit before it is put into the case 1 wherein it is held by the clamping nuts 25.

It will be observed that, contrary to the usual construction, no magnet of any sort is used and this adds materially in attaching the object of the invention as set forth in the early part of this specification.

While I have shown a preferred form of construction, it is to be understood that certain of the mechanical details may be varied without departing from the spirit of my invention or the scope of the appended claims.

Having thus described my invention, what I claim is:

1. An electrical measuring instrument including; a casing, a pair of circuit terminal studs carried by the casing and at least one being insulated therefrom, a dial supported by said studs and forming the only electrical circuit therebetween, said dial having an arm formed to support a movable system, a movable system including an armature and a pointer pivotally mounted on parts of said arm, said dial being slotted so all the current is forced to flow through the dial over the armature, thereby setting up a flux which will act on said armature to move it and the pointer for the purpose described.

2. An electrical measuring instrument including; a casing, a pair of circuit terminal studs carried by the casing and at least one being insulated therefrom, a dial supported by said studs and forming an electrical circuit therebetween, said dial having an arm formed to support a movable system, a movable system including an armature and a pointer pivotally mounted on parts of said arm, said dial being slotted on a diameter substantially at right angles to a straight line joining said studs, the slot extending to a point nearly over said armature so the current flowing through the dial will set up a flux which will act on said armature to move it and the pointer for the purpose described.

3. An electrical measuring instrument including; a casing, a pair of circuit terminal studs carried by the casing and at least one being insulated therefrom, a dial supported by said studs and forming an electrical circuit therebetween, said dial having an arm formed to support a movable system, a movable system including an armature and a pointer pivotally mounted on parts of said arm, said dial having an arcuate slot for that part of the pointer extending from the armature to the part lying over the dial, and also having a slot extending from the arcuate slot to that part of the periphery opposite to said lug whereby the current flowing in the dial is directed through the dial so as to set up a flux which will act on said armature to turn it and the pointer.

4. An electrical measuring instrument including; a pair of contact terminal studs, a dial carried by said studs and completing the only electric circuit therebetween, an armature pivotally carried on a part of the dial, a pointer moved by the armature, said dial being slotted to direct the current through the dial over said armature, whereby the flux set up by the current will act on said armature for the purpose described.

5. An electrical measuring instrument including; a pair of contact terminal studs, a dial carried by said studs and completing the only electric circuit therebetween, an armature pivotally carried on a part of the dial, a pointer moved by the armature, said dial being slotted to direct all of the current through the dial over said armature, whereby the flux set up by the current will act on said armature for the purpose described, the length of said slot determining the amount of deflection of the pointer for a given current through the dial.

6. An electrical measuring instrument including; a pair of contact terminal studs, a dial carried by said studs and completing the only electric circuit therebetween, an armature pivotally carried on a part of the dial, a pointer moved by the armature, said dial having an arcuate slot for that part of the pointer extending from the armature to the part lying over the dial, and also having a slot extending from the the arcuate slot to the periphery of the dial opposite to the part carrying said armature, whereby the flux set up by the current through the dial will act on said armature to move it and the pointer, the length and location of the slots determining the amount of deflection of the pointer for a given current through the dial.

7. For an electrical measuring instrument, a unitary structure including; a metallic dial plate having a pair of terminal studs connected thereto, an armature pivotally carried on a part of the dial and spaced between said studs, a pointer moved by the armature, and means included in the construction of the dial to direct all the current through that part of the dial directly between said studs whereby a magnetic field will be set up so as to act on said armature.

8. For an electrical measuring instrument, a unitary structure including; a dial having a pair of terminal studs connected thereto and an arcuate slot through which a pointer may extend, said dial forming the only path for the current passing from one stud to the other, an armature pivotally carried on a part of the dial adjacent said current path, a pointer moved by the armature and extending through said arcuate slot, and means comprising, at least one slot, extending from the periphery of the dial to said arcuate slot and located outside that part of the dial, including the part carrying the armature, cut off by a line joining the said studs and extending to the periphery of the dial, for causing the current to travel through that part of the dial directly between said studs, whereby a magnetic flux is set up which will act on said armature.

In testimony whereof, I affix my signature.

IVAR W. BROGGER.